(12) United States Patent
Broome

(10) Patent No.: US 7,503,744 B1
(45) Date of Patent: Mar. 17, 2009

(54) UNDERSHOT IMPULSE JET DRIVEN WATERWHEEL HAVING AN AUTOMATICALLY ADJUSTABLE RADIAL GATE FOR OPTIMAL HYDROELECTRIC POWER GENERATION AND WATER LEVEL CONTROL

(76) Inventor: Kenneth R. Broome, 100 Rocky Creek Rd., Woodside, CA (US) 94062

( * ) Notice: Subject to any disclaimer, the term of this patent is extended or adjusted under 35 U.S.C. 154(b) by 395 days.

(21) Appl. No.: 11/244,453

(22) Filed: Oct. 6, 2005

(51) Int. Cl.
*F03B 15/20* (2006.01)
(52) U.S. Cl. .......................... 415/3.1; 415/4.1; 415/151
(58) Field of Classification Search ............... 415/3.1, 415/4.1, 24, 149.1, 151, 155, 165, 202
See application file for complete search history.

(56) References Cited

U.S. PATENT DOCUMENTS

| | | | | |
|---|---|---|---|---|
| 1,436,933 A | * | 11/1922 | Banki .......................... 415/53.1 |
| 1,914,926 A | * | 6/1933 | Pfau ............................... 415/24 |
| 4,864,152 A | * | 9/1989 | Pedersen ....................... 290/53 |
| 4,948,985 A | * | 8/1990 | Adams .......................... 290/54 |
| 6,206,630 B1 | * | 3/2001 | Feltenberger et al. ........ 415/3.1 |
| 2006/0245919 A1 | * | 11/2006 | Krizik et al. ................. 415/202 |

* cited by examiner

*Primary Examiner*—Edward Look
*Assistant Examiner*—Nathaniel Wiehe
(74) *Attorney, Agent, or Firm*—Michael Hetherington

(57) ABSTRACT

A low-head impulse jet waterwheel for power generation at irrigation canal drop structures and navigation dam spillways achieves renewable electric power generation that has been lost until now due to lack of suitable equipment to convert such energy at competitive cost. Conventional practice has limited use of impulse turbines to heads of more than 50 meters or about 150 feet. However, there is now no need for such a limitation. Kinetic energy of a low-pressure jet is employed in a way that enables numerous locations to generate electricity conveniently near points of use, from a renewable source at minimum cost. The equipment can be pre-assembled for minimum installation cost at sites with no existing impoundment and can be automatically raised clear of flood levels with built-in lifting equipment. Existing multi-span bridges offer convenient access for installation and maintenance. Raising the equipment also provides clear passage for fish migration.

2 Claims, 6 Drawing Sheets

UNDERSHOT IMPULSE JET DRIVEN WATERWHEEL HAVING AN AUTOMATICALLY ADJUSTABLE RADIAL GATE FOR OPTIMAL HYDROELECTRIC POWER GENERATION AND WATER LEVEL CONTROL

BACKGROUND

1. Field of the Invention

The field of the invention generally relates to hydroelectric power generation. In particular, the field of the invention relates to an undershot impulse-jet driven water wheel for placement in a water course such as an irrigation canal or navigable river, without the need for a dam, wherein the water wheel assembly comprises an automatically adjustable radial gate and hinged upper flap to maximize the hydraulic head and optimize the shape of a rectangular shaped jet and to actively maintain the upstream water level within defined limits at any predetermined elevation, that is constrained only by the height of the banks upstream of the installation.

2. Background of Related Art

Conventional waterwheels for generation of electric power contain a speed-increaser gear unit and an electric generator either internally contained within the waterwheel or mounted on a platform located above the waterwheel. Such waterwheel-driven generating units are disclosed in the inventor's own U.S. Pat. No. 5,440,175, entitled "Waterwheel-Driven Generating Unit," issued Aug. 8, 1995 and in U.S. Pat. No. 6,208,037, "Waterwheel-Driven Generating Assembly," issued Mar. 27, 2001, both of which are incorporated herein by reference.

Generation of electricity at very low-head dams (less than about 15 feet difference between water levels upstream and downstream of a dam) has become uncompetitive with other forms of electric power generation. This is due to a lack of suitable equipment that can be installed for a total capital cost lower than that of other forms of generation from renewable sources, such as wind power, wave power and solar energy that have no fuel costs. With no hydro generating equipment designed specifically for very low-head sites, the typical approach until now has been to adapt the same types of hydro turbine used at higher-head sites to the lower head sites.

There have been two problems with this approach however. First, the volume of water required to develop the same power output increases inversely to the reduction in head, thereby requiring larger diameter equipment and greater amounts of excavation and concrete for the water passages, all at progressively higher cost for diminishing revenue. Secondly, the proportions of cost required to construct the civil works actually increases faster than the cost of the equipment.

Consequently, what is needed is a more cost-effective waterwheel-driven generating unit characterized by installation costs reduced to the absolute minimum and wherein power-generating equipment is designed for ease of shop fabrication, pre-assembly and transportation at minimal expense.

Impulse-jet turbines of the Pelton or Turgo type using jets of circular cross-section have been used for many years to generate electricity at locations where the available hydraulic head is greater than about 15 meters (about 50 feet). According to the "Guide to Hydropower Mechanical Design" prepared by the American Society of Mechanical Engineers Hydro Power Technical Committee, sites having lower heads were considered more suitable for hydro development using reaction turbines of the Kaplan or propeller type, based on relative efficiencies and the economics of equipment and installation costs. As previously mentioned, however, at very low heads, the cost of both equipment and the civil works needed for conveying water to and from the equipment increases disproportionately in comparison to the value of power produced.

Using presently available equipment and installation methods results in the cost of power becoming uncompetitive at hydraulic head differences less than about 15 feet. Therefore, what is needed is an undershot impulse-jet type of waterwheel designed to maximize the energy obtainable from a given volume of discharge and hydraulic head by utilizing the potential pressure and volume of a rectangular jet impinging on vanes at the bottom of their travel rather than using mainly a gravity effect of a conventional overshot waterwheel, or the kinetic energy in a flowing stream that has traditionally been used to drive the reaction type of undershot waterwheels. The higher velocity of the jet facilitates a greater volume of discharge and rate of rotation with consequent higher power output than either a gravity-driven overshot wheel or a reaction type of undershot waterwheel can develop from the same head and flow.

Up to now, conventional low head hydro generation systems have been inefficient power sources, and are not competitive with other forms of non-fuel based energy production such as wind, wave or solar power. Conventional low-head hydro equipment systems focus on increasing efficiency, resulting in increased manufacturing and installation costs. Efficiency is not the economic key to success. Rather, the key to competitive success for low-head hydropower is to minimize the cost of investment per kilowatt-hour of production. Therefore, what is needed is a low-head hydro generation system and method that maximizes kilowatt-hour production while minimizing investment in component cost and installation. Furthermore, the diameter and consequently the cost of an impulse-jet driven undershot waterwheel can be much less than that of an overshot waterwheel designed to develop power from a particular head since the diameter of the impulse-jet waterwheel can be much less than the available head.

SUMMARY

In accordance with the foregoing and other objectives, an undershot water wheel is provided for placement in a watercourse with or without an impoundment, such as an irrigation canal, or navigable river. The waterwheel assembly comprises an automatically adjustable radial gate that optimizes the hydraulic head at the jet and maintains the upstream water level within narrowly defined limits at any predetermined elevation, thereby providing watershed sustainability—a feature of significant value in irrigated areas served by gravity flow from the canal.

An aspect of the invention adapts the impulse type of turbine to very low-head sites by using a wide aspect ratio waterwheel configuration with a single full-width rectangular shaped jet directed at the lowest point of travel of each vane on the wheel. This single jet is controlled by a radial gate that is raised to increase the height of the opening and jet, and lowered to reduce the height of the jet and rate of discharge. This type of waterwheel assembly thereby acts as its own dam, creating its own head that can be greater than the diameter of the waterwheel itself by adding the hinged flap described below.

Another aspect of the invention provides a modular waterwheel, radial gate, speed increaser and generator assembly, wherein the wide aspect ratio wheel and associated radial gate are disposed across the full width of a low head watercourse such as an irrigation system, canal, or ditch without the need for a permanent impoundment. The waterwheel assembly forms the impoundment and creates its own head. The modular system can be installed in place by a crane or assembled in place in a low head watercourse previously unavailable for economic hydroelectric power generation.

The lower boundary of the jet is formed by a sole plate disposed in the bed of the waterway at an elevation such that the water level downstream of the installation is usually at a lower level than the top of the sole plate. Such a relationship ensures that the jet impinges on the vanes at atmospheric pressure rather than being submerged in tailwater.

The shape of the sole plate is curved to conform to the boundary conditions favoring minimum contraction of the jet as it impinges on each vane of the waterwheel. The sole plate in conjunction with the shape of the radial gate forms the jet in a hydraulically efficient way such that the emerging jet is optimized and without contraction, thereby increasing the energy transferred from the water jet into the water wheel.

A hinged flap is attached to the upper edge of the radial gate in order to increase the effective pressure at the elevation of the jet beyond the diameter of the wheel itself. This flap can be adjusted to achieve maximum upstream water level at any position of the radial gate and is curved to the same radius as the radial gate such that is can be lowered to discharge flows in the waterway that are higher than can be passed through the waterwheel under the radial gate.

An inclined steel bar trashrack is installed on the upstream side of the waterwheel such that trash will collect at the upper end of the trash rack. Trash can be removed either manually or by machine from the deck of the installation.

An additional aspect of the invention maintains a desired upstream water surface elevation by locally or remotely opening or closing the radial gate and superposed flap, regardless of stream flow within the limits of the design. The purpose of maintaining the desired upstream water surface elevation advantageously enables control of water surface elevations in irrigation canals and navigable rivers. This can avoid flooding and can achieve gravity flow into selected adjacent irrigation systems as well as maintaining necessary minimum depth for navigation. Control of water surface elevations in irrigation canals is a primary operational constraint that in many existing canals is achieved by raising or lowering the tops of weirs formed by manually placing or removing wooden boards one on top of another in slots supported by steel posts or concrete abutments.

This aspect of the invention includes the installation of automatic or remotely controlled radial gates on a series of waterwheels disposed throughout a watershed or irrigation system to control water flow automatically throughout such a system for optimal watershed management. The automatic control system becomes financially feasible by means of the source of revenue derived from the sale of electric power in addition to the saving in the cost of labor necessary to manually adjust the height of weir boards.

In this aspect of the invention, a sensor is disposed upstream of each radial gate for providing an output signal indicating a sensed surface water level. In response to the output signal of the water level sensor, the radial gate is raised or lowered by a desired amount to achieve a predetermined water level upstream of the radial gate. The data from water level sensors at a plurality of radial gates located sequentially along the length of a water course also may be analyzed at a central processing unit and a control signal sent for remotely actuating selected radial gates to be raised or lowered to achieve a desired overall water level upstream of each radial gate for watershed management or water allocation in an irrigation system, or the like.

In like manner, a plurality of radial gates and associated water level sensors may be disposed in a concatenated fashion across the width of a river, for example, either just upstream of an existing multi-span bridge or at an existing low-head dam with control gates. The water level sensor at each radial gate can be monitored and each radial gate automatically lowered or raised to maintain the overall water level at a predetermined elevation. Arrangements can be made to raise the complete assembly above flood level or to provide maintenance access by means of synchronized jack screws or hydraulic cylinders located at each corner of the platform.

DESCRIPTION OF THE PREFERRED EMBODIMENTS

Design of the waterwheel and vanes and the location of speed increaser and generator in coaxial arrangement within the hub of the waterwheel are described in U.S. Pat. No. 5,440,175, "Waterwheel-Driven Generating Unit," and in U.S. Pat. No. 6,208,037, "Waterwheel-Driven Generating Assembly," which are incorporated herein by reference.

Figure 1:
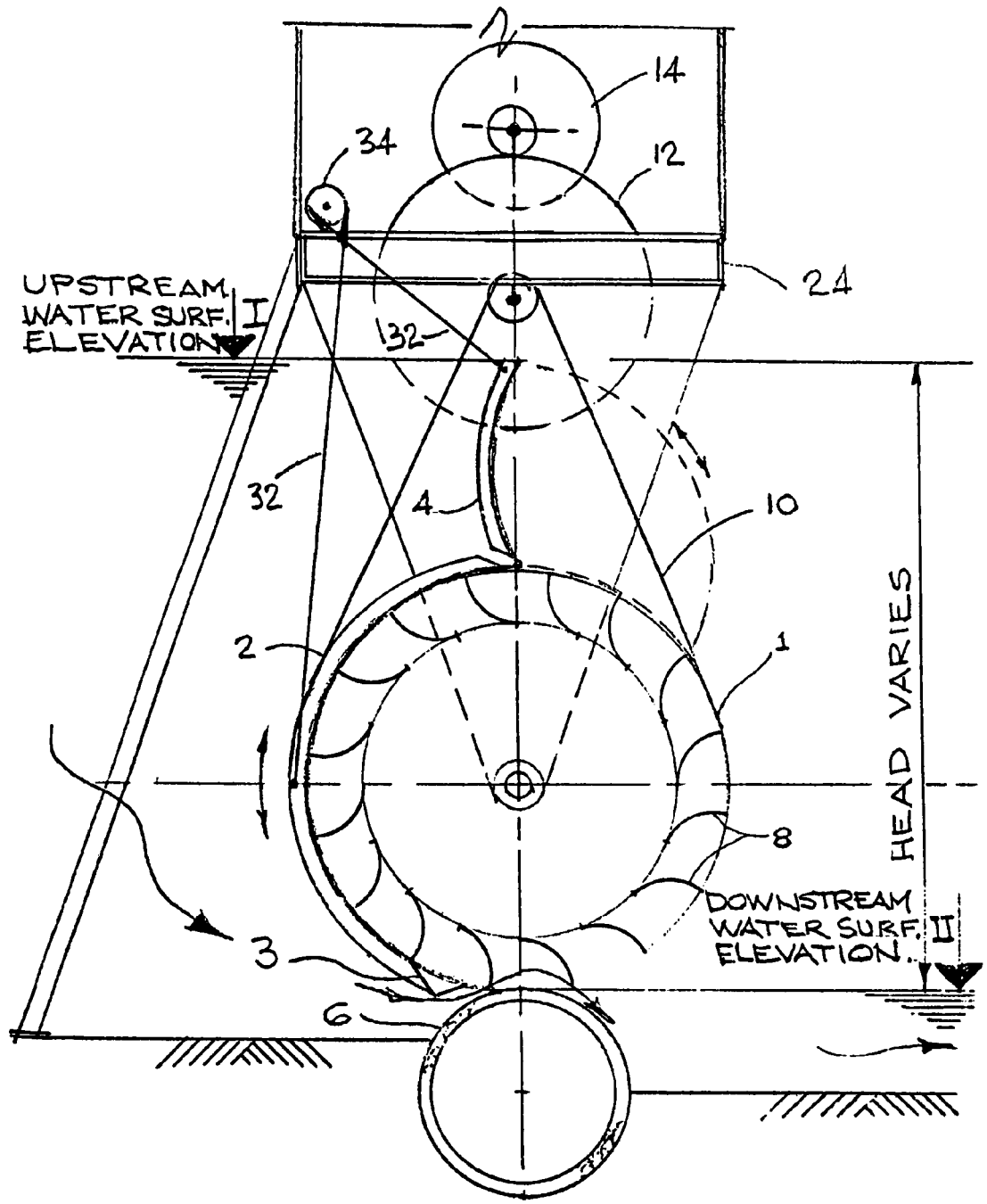
FIG. 1 is a vertical cross section taken on Line 1-1 of FIG. 3 of a water wheel generating unit constructed in accordance with an aspect of the invention.

Referring to the drawings, FIG. 1 shows a waterwheel 1 with a radial gate 2, a moveable flap gate 4, sole plate 6 for directing water flow together with the radial gate 2 into a plurality of vanes 8 disposed radially about the waterwheel 1. A chain drive 10 is coupled with a speed increaser 12 and spur gear arrangement which provides an appropriate speed for generator 14. Preferably the speed increaser 12 is an epicyclical sun and planetary gear arrangement which takes the speed of rotation of wheel 1 and converts it to a useful speed for the generator, for example 2400 rpm. The speed increaser can provide on the order of an 80:1 step-up for generator 14.

Figure 2:
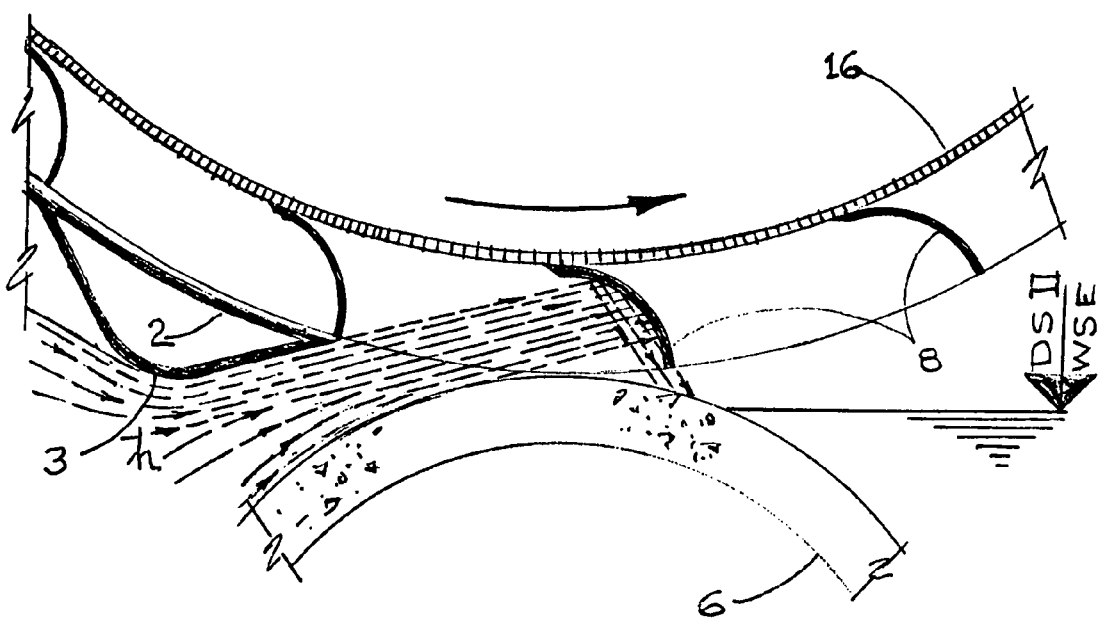
FIG. 2 is a detailed cross-section of the variable height opening or nozzle that forms the jet that impinges on each vane of the wheel as the wheel revolves.

Referring to FIG. 2, the lower edge of the movable flap gate 4 is modified by the addition of a curved flow nozzle 3 to shape the jet for optimum performance. The exact shape of this nozzle will be determined by Computational Flow Dynamic Analysis to suit the particular conditions at each installation.

Figure 3:
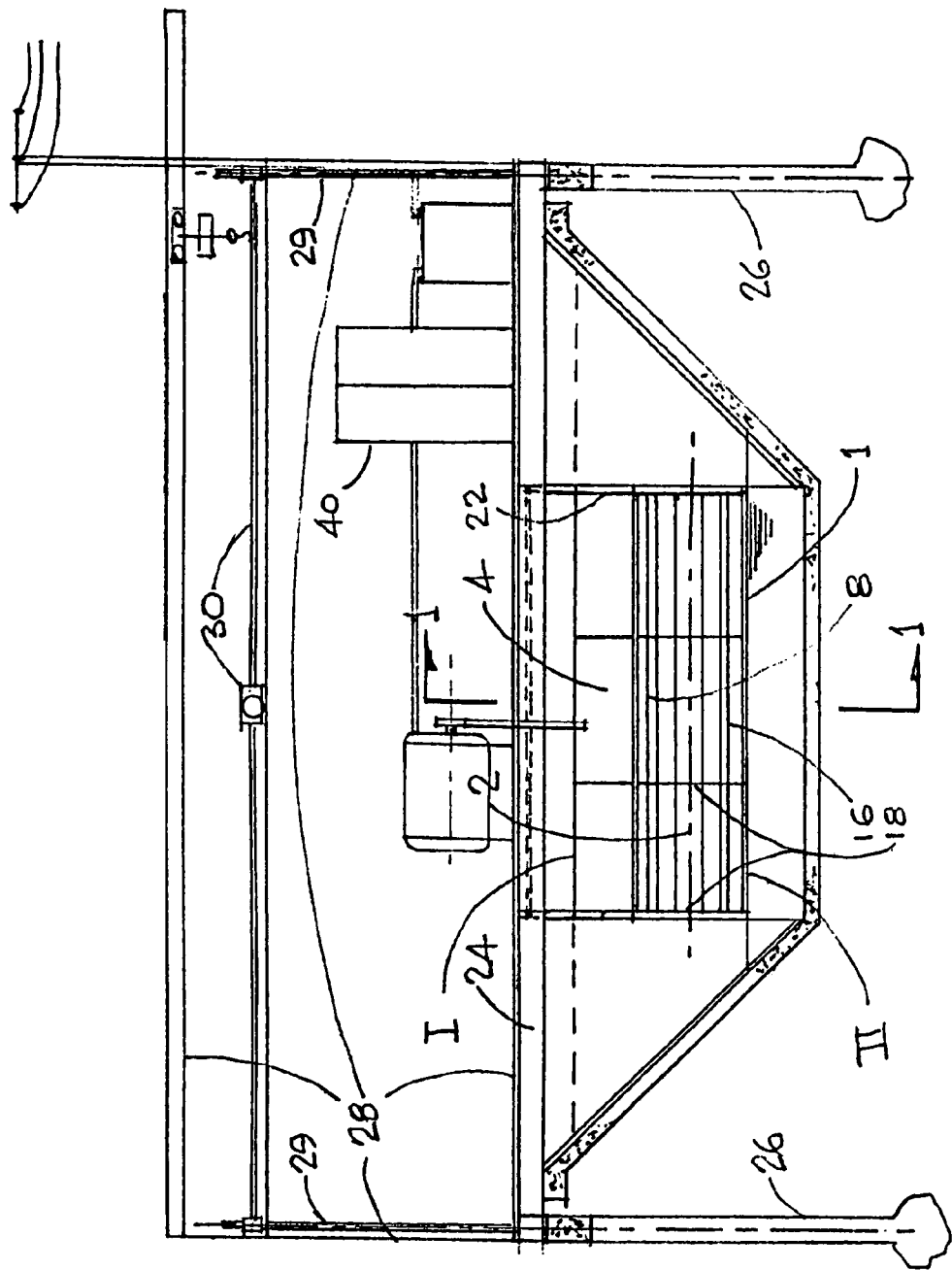
FIG. 3 is a front view from downstream of a water wheel generating unit installed in an irrigation canal and constructed in accordance with an aspect of the invention.

Referring to FIGS. 1-3, an undershot waterwheel 1 is operable between headwater I and tailwater II and comprises a central metal cylinder generally designated 16 which is surrounded by a multiple set of vanes 8 which are fixedly attached at each end to flat circular metal discs 18 (FIG. 3). The waterwheel 1 comprises a low head impulse turbine that may be constructed in any structurally rigid length to span a watercourse. As shown in FIG. 3, waterwheel 1 is a wide aspect ratio waterwheel. In combination with flap 4 and radial gate 2, the wide aspect ratio waterwheel 1 creates a useful head of water without the necessity of an impoundment. Rigidly attached metal discs 18 provide support to the vanes 8.

It will be appreciated that the waterwheel is characterized by a wide aspect ratio. That is, the waterwheel can be constructed in a desired length to span the entire width of a low head watercourse such as an irrigation system canal, or ditch. The waterwheel acts as its own dam, creating its own useful head from a watercourse without the need for an impoundment. In the case of a low head, wide water channel, a plurality of waterwheel generating units can be disposed side by side across the entire width of the channel to thereby create a useful head of water for hydro power generation with minimal installation cost, particularly if there is an existing bridge available for access during both installation and subsequent operation.

Referring to FIGS. 2 and 3, the central metal cylinder 16 has stub axles that project at each end beyond the circular metal end discs a distance sufficient to provide space for standard journal bearings that each support half the weight and water pressure on the waterwheel and transfer the load through a steel suspension frame 22 to the transverse girders 24 that span the waterway and convey the load to foundations 26 on either side of the waterway. It is important to provide bearings at either end of the water wheel that are capable of withstanding some degree of end loading as well as transverse loads.

Figure 4:
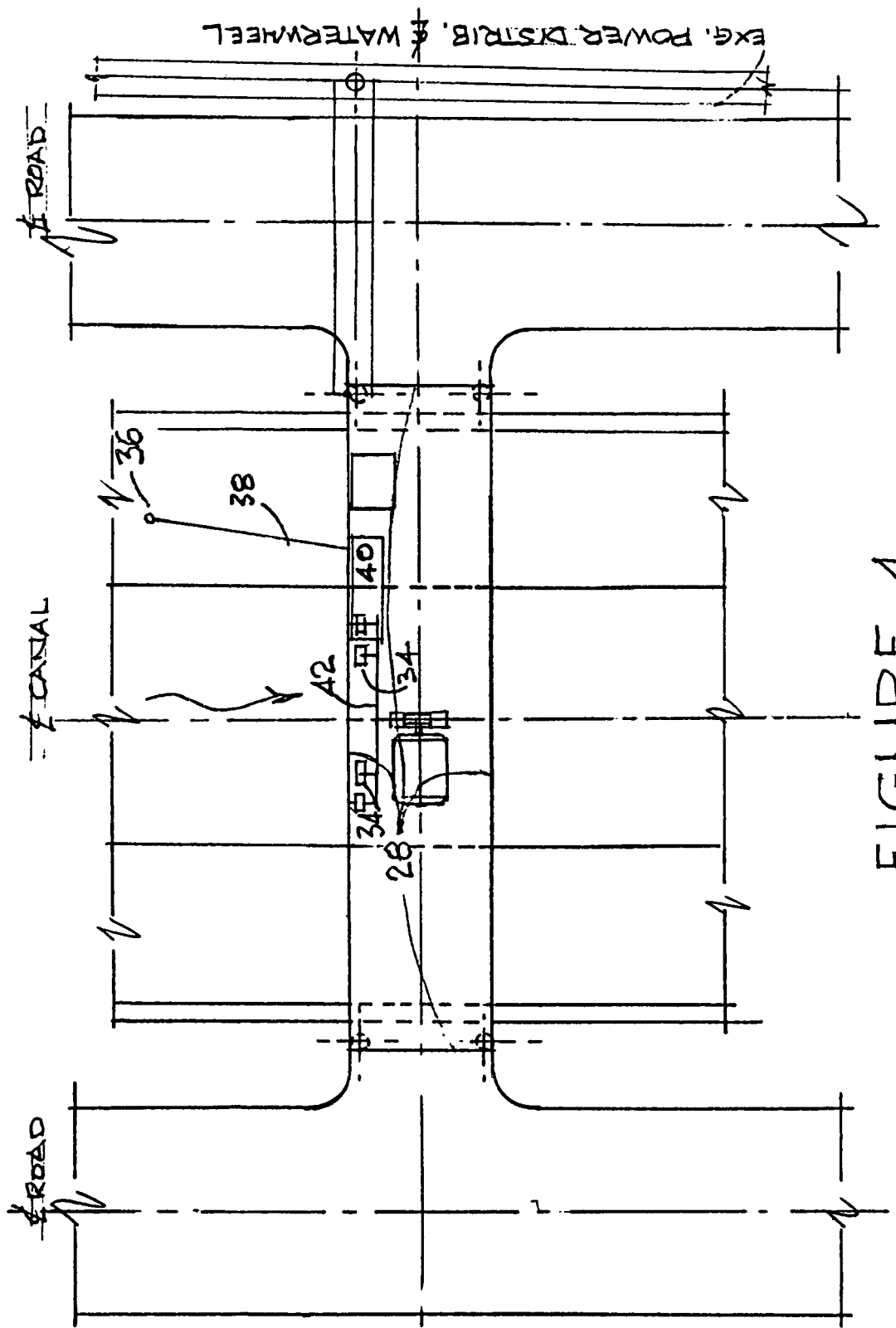
FIG. 4 is a plan view of a waterwheel-generating unit, installed in an irrigation canal, wherein the water wheel generating unit acts as a dam and creates its own head in accordance with an aspect of the invention.

Referring to FIGS. 3 and 4, it will be appreciated that the steel suspension frame and transverse girders can be provided as a modular box structure 28 to accommodate the water wheel assembly and enable the waterwheel to be installed as a modular unit for low cost placement in a typical low head watercourse such as an irrigation canal. The box structure 28 provides support for the waterwheel gear system and generator assembly. The box structure 28 can be provided as a prefabricated structure. Such a prefabricated box structure 28 can be made from either painted or galvanized steel for both strength and durability.

If it is necessary to lift the waterwheel assembly completely clear of the water channel to provide maximum flood discharge capacity, a system of four synchronized jack screws can be provided, one at each corner of the platform that is part of the box structure. These jack screws 29 can be driven by a system of horizontal shafts and gears from a single electric motor 30. Alternatively a system of hydraulic cylinders can be used to raise and lower the platform using a hand-operated or electrically driven hydraulic pump to provide the necessary power.

Figure 5:
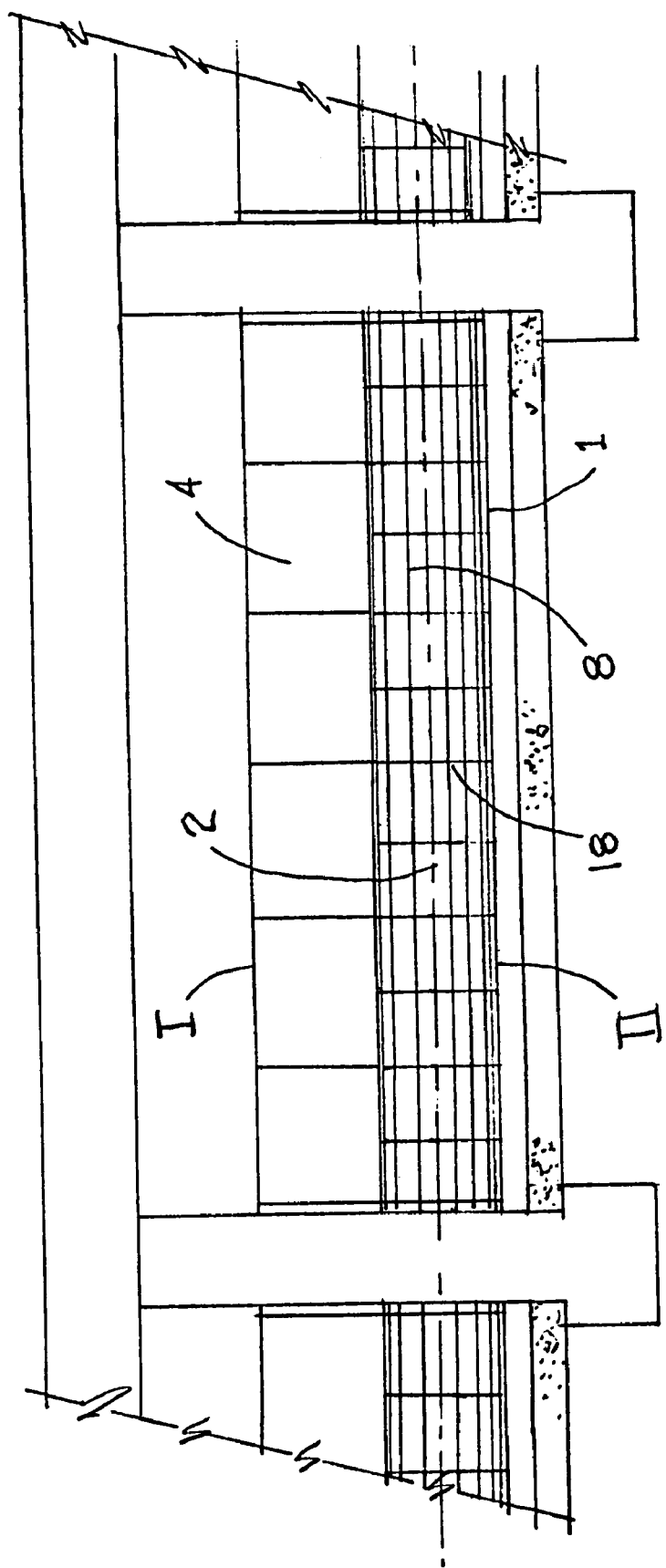
FIG. 5 is a front view from downstream of an installation at an existing multi-span bridge or navigation dam showing the modular support structure for the waterwheel, enabling the waterwheel and generator assembly to be quickly and easily constructed in an existing watercourse such as a river or diversion channel in accordance with an aspect of the invention.
Figure 6:
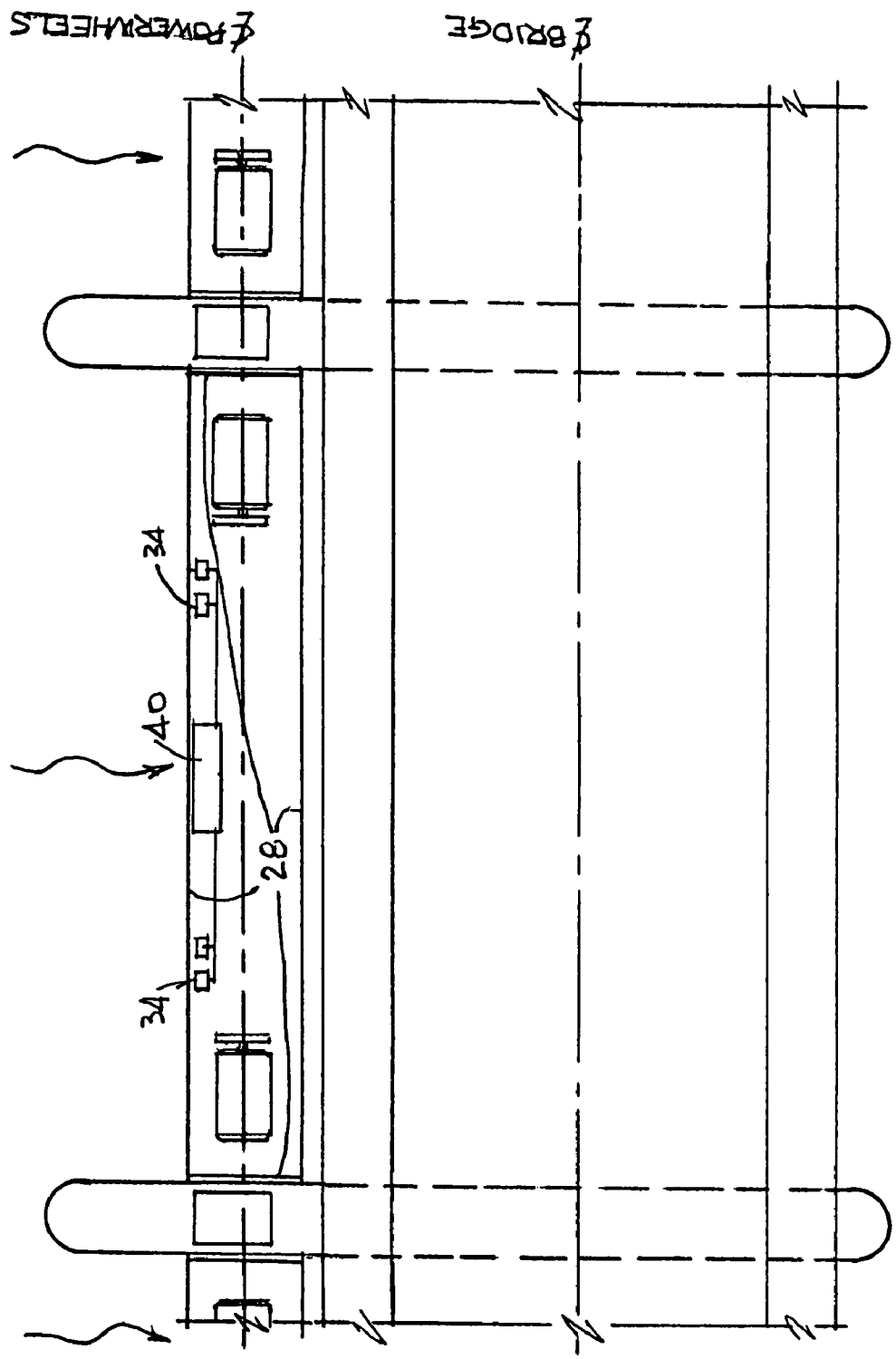
FIG. 6 is a plan view of a waterwheel installed just upstream of an existing multi-span bridge.

With reference to FIGS. 5 and 6, being an elevation from downstream and a plan view, respectively, of an installation of the undershot impulse jet driven waterwheel assembly immediately upstream of an existing bridge across a river having banks high enough to develop a head difference of up to, say, 20 feet during average annual discharge. The bridge may have multiple spans each one of which could accommodate a waterwheel. The bridge could provide access for both initial installation and subsequent maintenance.

With reference to FIG. 1, a chain drive 10 may be employed at one or both ends of the waterwheel with a drive sprocket of diameter equivalent to that of the waterwheel and a driven sprocket of about 1/6 of that diameter. The driven sprocket in turn causes a large spur gear on the same shaft to engage a much smaller gear on the generator shaft with an overall ratio of waterwheel speed to generator speed of 1:40. However, this ratio can be increased to 1:80 using the epicyclical gear arrangement described previously.

A curved steel radial gate 2 is provided on the upstream side of the waterwheel. The radial gate rotates on guide bearings about the center of the waterwheel and controls the height of the opening at the bottom of the waterwheel. The radial gate 2 is supported radially and laterally on curved tracks incorporated in each end of the support frames with a low friction surface to facilitate movement. Referring to FIG. 1, the radial gate 2 can be raised or lowered by convenient control means, such as steel cables 32 operated by winches 34 mounted on the steel girders 24 that support the waterwheel. The radial gate 2 forms the upper surface of the rectangular jet of water under pressure from the upstream water surface elevation that drives the waterwheel by impingement of the jet on each vane in the wheel in turn as it passes in front of the jet.

The radial gate 2 has an inside radius slightly greater than the outside radius of the waterwheel in order to provide sufficient clearance to prevent contact. The radial gate rotates on guide bearings about the center of the waterwheel and controls the height of the opening at the bottom of the waterwheel. Referring to FIGS. 1, and 2, the radial gate 2 forms the upper surface of the jet of water under pressure from the upstream water surface elevation that drives the waterwheel by impingement of the jet on each vane on the wheel in turn as it passes in front of the jet. The jets of water are indicated by the arrows in region h (height in feet of the opening below the radial gate and above the top of the sole plate) in FIG. 2. The lower surface of the jet is formed by the curved surface of a metal or concrete sole plate 6 located in the bed of the waterway immediately beneath the waterwheel. The shape of the sole plate 6 is designed to minimize contraction of the jet downstream of the orifice and thus maximize the volume of water discharged by the jet and hence the energy that is transferred to the vanes in the wheel. The sole plate 6 confines the lower boundary of the jet to a level above the downstream water surface elevation II and is shaped in a curve that conforms to hydraulic conditions that minimize contraction of the jet as it emerges below the bottom of the gate.

The radial gate 2, when raised, provides a rectangular-shaped opening in close proximity to the bottom of the waterwheel to enable a jet of water to impinge on each vane in turn causing the waterwheel to rotate. The radial gate 2 also causes the water level upstream of the waterwheel to rise until the discharge through the jet is equal to the inflow from upstream.

A hinged flap 4 mounted on top or attached to the upper edge of the radial gate 2 permits the upstream water level to be raised higher than the top of the waterwheel, thus increasing the power produced for a particular diameter of waterwheel. This flap 4 can be lowered by steel cables 32, operated by winches 34 mounted on the support girders 24 such that the flap conforms to the shape of the waterwheel and permits discharge of water flow in excess of the capacity of the waterwheel. Thus, the hinged flap 4 in combination with the radial gate 2 can increase the upstream water surface elevation when maintained in an upright position, or can release flows greater than the capacity of the waterwheel when lowered to conform to the surface of the waterwheel.

Control of water surface elevations in irrigation canals is a primary operational constraint that in many existing canals can be achieved only by raising or lowering the tops of weirs formed by manually placing or removing horizontal wooden boards one on top of another in slots supported by steel posts or concrete abutments. The purpose of maintaining the desired upstream water surface elevation may be simply to avoid flooding by overtopping the banks, or to achieve gravity flow into adjacent irrigation systems. The invention described herein will make the installation of automatic or remotely controlled radial gates financially feasible by providing a source of revenue in the sale of power to pay for them in addition to the saving in cost of the labor necessary to manually adjust the height of weir boards.

It will be appreciated that the radial gate 2 in combination with the hinged flap 4 can provide a previously unattainable degree of control over the flow and dispersion of water upstream of the waterwheel in comparison with conventional systems. Such control can be achieved automatically in response to changing water levels. As shown on FIG. 4, a water level sensor means 36 is disposed upstream of the radial gate 2 and flap 4 for sensing upstream water level. In response to a change in water level, the water level sensor 36 provides an output signal representative of sensed water level over a wired or wireless communication channel 38 to an input port of controller 40. Controller 40 includes a microprocessor that analyzes the signal from water level sensor 36. If a change in the height of the flap or radial gate is desired to maintain the upstream water level within a predetermined range, controller 40 sends a control signal over wired or wireless communication channel 42 to a motor or other means for raising or lowering the flap and/or radial gate, such as winches 34. The radial gate and/or the flap are then raised or lowered a predetermined amount to keep the upstream water level I at a desired level or within a predetermined range. This aspect of the invention can maintain a desired upstream water surface elevation by locally or remotely opening or closing the radial gate 2 and superposed flap 4, regardless of stream flow within the limits of the design.

The controller 40 also can be communicatively linked with additional water level sensors remotely located at other waterwheels upstream or downstream in an irrigation system and receive signals representative of water levels at such remote locations. This would make possible the coordinated monitoring of water level data and improved control of water resources throughout an irrigation system.

Basis of Design and Method of Control

Design of the sole plate, radial gate, and hinged flap follows conventional hydraulic and structural engineering principles in which hydrostatic and hydrodynamic load pressures are calculated and the material, shape, and size of the various components determined by hydrodynamic and mathematical analysis to assure that losses are minimized and that allowable stresses and deflections established by applicable standards and codes of practice are not exceeded.

Overall stability of the waterwheel support structure must also be analyzed to assure the necessary factor of safety against sliding or overturning and that required anchorage devices and foundation materials are sufficient and adequate for the purpose. Depending upon the length of the wheel, a plurality of circular disc stiffeners disposed along the length of the wheel define the ends of the vanes as well as provide lateral stability for the wide aspect ratio waterwheel. Support bearings at either end of the wheel must be constructed to resist not only transverse but also any longitudinal forces that may be imposed by transient flow conditions.

Raising or lowering the radial gate and hinged flaps require the use of wire cable and winches that can either be manually or electrically and/or automatically operated. In order to lower the main radial gate, the weight must either exceed the frictional resistance to such movement, or additional means such as downward pulling wire ropes, jacks or some kind of extra weight must be added to make closure possible.

Operation of the radial gate 2 and hinged flap gate 4 is achieved by raising both components from the fully closed position until the maximum allowable upstream water surface elevation can be maintained in a stable manner indicating that inflow from the upstream source equals outflow under the gate at maximum available head difference. Such a gate setting will cause the undershot impulse jet waterwheel to generate maximum power. As inflows change, the upstream water level sensor will detect a rise or fall in the upstream water surface elevation I and automatically raise or lower the radial gate assembly accordingly.

Conditions for Maximum Power Output

Referring to FIGS. 1, 2 and 5, conditions for maximum power output for a given volume of discharge Q and available gross head H are as follows:

Minimum contraction of the jet can be achieved by shaping the curvature of the upper and lower approach surfaces of the gate lip and sole plate that constitute the nozzle to equal the maximum height of the opening (h). Such a condition provides a coefficient of discharge that is close to 1.0.

Absorption of as much of the kinetic energy as possible from the jet can be achieved by deflecting the water stream 90° and by allowing gravity to assist in discharging the water directly downwards into tail water compared to a generally horizontal direction of approach.

Reducing entry losses to a minimum is achieved by curving the shape of the vanes such that the vane surface at entry of the jet is parallel to the direction of the approaching flow and is shaped with a curve that turns the water in the jet through at least a 90 degree angle before discharge into the tailwater.

Power output in kilowatts is given by the following:

$$\text{power output in kilowatts} = \frac{\eta x Q x (H - h/2)}{11.8}$$

$Q$ = cubic feet per second flow $H$ = gross head difference in feet between upstream and downstream water levels $h$ = height in feet of the opening below the radial gate and the top of the sole plate $\eta$ = overall efficiency in terms of $\frac{\text{energy delivered}}{\text{energy available}}$ Operational Features and Functional Mode As the radial gate is raised, a rectangular jet of water is released between the lower edge of the gate and the upper surface of the sole plate. This jet impinges tangentially on the inside upper surface of each vane in turn and is then deflected downwards along the vane's inner surface towards the tail water downstream of the installation. As the rotor turns the jet is interrupted by the following vane and water from the preceding vanes drops into the tail water downstream of the waterwheel effectively at right angles to the direction of the jet. The dynamic energy of the jet is thus increasingly transferred to the waterwheel by each vane in turn passing in front of the jet.

The foregoing description illustrates preferred embodiments of the invention. While the invention has been described in connection with what are presently considered to be the most practical and preferred embodiments, it is to be understood that the invention is not limited to the disclosed embodiments, but rather is intended to cover various modifications and equivalent arrangements which are included within the scope of the following proposed claims.

For example, a plurality of waterwheels according to the invention could be communicatively networked by many different conventional control systems along an entire irrigation system. This arrangement would enable automated monitoring of water flow and surface water levels at each radial gate. Thus, a series of networked waterwheels and included radial gates would enable surface water levels throughout an entire irrigation system to be closely controlled for optimal water allocation.

However, such concepts necessarily employ the moveable radial gate of the present invention. Therefore, persons of ordinary skill in this field are to understand that all such equivalent arrangements and modifications are to be included within the scope if the following proposed claims to be included in a forthcoming non provisional patent application.

What is claimed is:

1. An undershot impulse-jet driven waterwheel for generating electric power including a plurality of vanes disposed radially about the circumference of the water wheel, the water wheel assembly characterized by a longitudinal axis extending transversely across a stream flow to act as an impoundment, the stream flow being contained by banks high enough to convey water at elevations of sufficient difference to accommodate a head of between five and fifteen feet between upstream and downstream of the waterwheel comprising:

a sole plate provided in the bed of the stream having a control surface coextensive with and parallel to the longitudinal axis of the waterwheel, the sole plate being of sufficient height for its control surface to rise above normal tail water elevation and having a cross-sectional shape designed to minimize contraction of a jet of water as it impacts the vanes;

a radial gate provided on an upstream side of the waterwheel, extending along its longitudinal axis, and having a curved cross-section conforming substantially to an outer diameter of the waterwheel with minimum clearance allowing contact free rotation of the vanes, the radial gate comprising a first surface for resisting water pressure from the upstream side of the waterwheel, and a lower edge spaced apart from the control surface of the sole plate such that a jet of water between the lower edge of the radial gate and the control surface of the sole plate is directed against the vanes with minimum contraction;

a hinged flap mounted on the upper edge of the radial gate having a radius similar to that of the radial gate and with a height sufficient to extend the depth of the upstream impoundment to the height of the banks upstream of the installation less an appropriate amount of freeboard; the flap is maintained in the required position by steel wire ropes and winches that can be lowered during periods of high discharge in the water course that exceed the capacity of the waterwheel such that the flap rests clear of the vanes and discharges excess water.

2. An undershot impulse-jet driven water wheel as in claim 1, wherein the jet impacts each vane at substantially 90 degrees and each vane passes over the control surface of the sole plate, such that water is discharged by gravity directly downwards into tail water and a maximum absorption of kinetic energy from the jet is achieved.

* * * * *